(12) United States Patent
Komatsuki et al.

(10) Patent No.: US 6,184,283 B1
(45) Date of Patent: Feb. 6, 2001

(54) RUBBER COMPOSITION FOR TREAD

(75) Inventors: Masato Komatsuki, Utsunomiya; Tetsuya Kunisawa, Akashi; Isamu Tsumori, Amagasaki, all of (JP)

(73) Assignee: Sumitomo Rubber Industries, Ltd., Hyogo-ken (JP)

( * ) Notice: Under 35 U.S.C. 154(b), the term of this patent shall be extended for 0 days.

(21) Appl. No.: 09/216,885

(22) Filed: Dec. 21, 1998

(30) Foreign Application Priority Data

Dec. 24, 1997 (JP) .................................................. 9-355412

(51) Int. Cl.[7] .............................. C08K 3/36; C08G 63/16
(52) U.S. Cl. ......................... 524/493; 524/559; 524/560; 524/601; 525/168; 525/315; 528/176; 528/272; 152/209.1
(58) Field of Search .................................... 524/493, 559, 524/560, 601; 528/176, 272; 525/315, 168; 152/209 R

(56) References Cited

U.S. PATENT DOCUMENTS

| 5,361,818 | * | 11/1994 | Tung et al. ........................... 152/525 |
| 5,580,919 | * | 12/1996 | Agostini et al. ...................... 524/495 |
| 5,821,290 | * | 10/1998 | Labauze et al. ...................... 524/493 |

FOREIGN PATENT DOCUMENTS

| 60-223840 | 11/1985 | (JP) . |
| 61-066733 | 4/1986 | (JP) . |
| 63-043937 | 2/1988 | (JP) . |
| 1242644 | 9/1989 | (JP) . |
| 7292154 | 11/1995 | (JP) . |

* cited by examiner

*Primary Examiner*—James J. Seidleck
*Assistant Examiner*—Olga Asinovsky
(74) *Attorney, Agent, or Firm*—Birch, Stewart, Kolasch & Birch, LLP

(57) ABSTRACT

A rubber composition for treads which contains silica and has a low electric resistance and further well-balanced characteristics such as a low rolling resistance, abrasion resistance and good wet performance can be obtained. The rubber composition comprises 40 to 90 parts by weight of silica and 5 to 40 parts by weight of diester of adipic acid based on 100 parts by weight of a diene rubber.

13 Claims, No Drawings

RUBBER COMPOSITION FOR TREAD

BACKGROUND OF THE INVENTION

The present invention relates to a rubber composition for tire tread.

Recently because of increasing social demand for reduction of fuel consumption of cars, in the development of low fuel consumption tires which have decreased rolling resistance, it has been generally attempted to decrease hysteresis loss of a rubber composition for tread. In the method to decrease the hysteresis loss, it is known that reduction of an amount of carbon black in the rubber composition for treads and use of silica as a filler are effective.

However decreasing the amount of carbon black increases the electric resistance of the rubber composition for treads, and thus an electric resistance of a tire obtained by using such a rubber composition for treads also becomes high. As a result, static electricity accumulates on the car body and tire, which causes radio noise and sparking at the time of filling fuel oil. Therefore, with respect to a rubber composition containing silica, in which the amount of carbon black is small, how the electric resistance is decreased is important.

The present inventors have found that the electric resistance can be decreased effectively when a specific diester of adipic acid is mixed to a rubber composition prepared by adding silica, and have completed the present invention.

For example, JP-A-60-223840, JP-A-61-66733, JP-A-63-43937, JP-A-1-242644 and JP-A-7-292154 disclose techniques to add an adipic acid ester as a plasticizer to a rubber composition. However, since only carbon black is used as a filler, a technique for decreasing electric resistance is not discovered and there is no disclosure and teaching with respect to the use of a diester of adipic acid for decreasing the electric resistance.

Namely, an object of the present invention is to obtain a rubber composition for treads which contains silica and has a low electric resistance. A further object of the present invention is to obtain a rubber composition for treads which contains silica and has well-balanced characteristics such as a low rolling resistance, abrasion resistance and good wet performance.

SUMMARY OF THE INVENTION

The present invention relates to a rubber composition for treads which comprises 40 to 90 parts by weight of silica and 5 to 40 parts by weight of a diester of adipic acid based on 100 parts by weight of a diene rubber.

In this case, it is preferred that 1 to 5 parts by weight of a metal salt is added further based on 100 parts by weight of the diester of adipic acid.

DETAILED DESCRIPTION

In the present invention, diene rubbers which have been used in the field of tires may be used without any limitation. Examples of the diene rubber are, for instance, natural rubber NR), styrene-butadiene rubber (SBR), isoprene rubber (IR), ethylene propylene diene rubber (EPDM), isoprene-butadiene rubber (IBR), butadiene rubber (BR), acrylonitrile-butadiene rubber (NBR), chloroprene rubber (CR) and the like. These diene rubbers are used alone or in optional combinations thereof. Among them, the diene rubbers using NR, BR, SBR or IR are preferable from the point that they are general purpose rubbers for tires.

In the present invention, silica which has been used in the field of tires may be used without any limitation. Example of the preferred silica is, for instance, one which has a BET specific surface area of from 150 to 250 $m^2$/g and a DBP oil absorption amount of from 190 to 280 ml/ 100 g from the viewpoints of an effect of reinforcing a rubber and a rubber processability.

Examples of such silica which is commercially available are, for instance, NIPSIL VN3 and NIPSIL AQ which are available from Nippon Silica Kabushiki Kaisha, Z1165MP and Z165Gr which are available from Rhône-Poulenc Co., Ultrasil VN3 available from Degussa Co., and the like.

An amount of silica added in the present invention may be from 40 to 90 parts by weight based on 100 parts by weight of the above-mentioned diene rubber, preferably from 60 to 90 parts by weight from the point of securing wet performance.

In the present invention, a diester of adipic acid is added, which decreases an electric resistance of the obtained rubber composition for treads. It can be considered that the existence of free electrons on oxygen atom of an ester bond can decrease the electric resistance of the obtained rubber composition for treads.

Examples of such diester of adipic acid are, for instance, di(polyethylene glycol) adipate (a reaction product of adipic acid and polyethylene glycol) represented by the formula (1): HO—$(CH_2$—$CH_2$—$O)_m$—OOC—$(CH_2)_4$—COO—$(O$—$CH_2CH_2)_m$—OH, in which m is an integer of from 10 to 20, di(diethylene glycol monoalkyl ether) adipate (a reaction product of adipic acid and ether) represented by the formula (2): $C_nH_{2n+1}$—O—$C_2H_4$—O—$C_2H_4$—OOC—$(CH_2)_4$—COO—$C_2H_4$—O—$C_2H_4$—O—$C_nH_{2n+1}$, in which n is 1, 2 or 4, and the like. From the viewpoint of high electric conductivity, it is preferred to use a compound represented by the formula (1).

The amount of the diester of adipic acid may be from 5 to 40 parts by weight based on 100 parts by weight of the above-mentioned diene rubber, preferably from 15 to 30 parts by weight from the point of balancing of electric resistance and abrasion resistance.

Also, the diester of adipic acid used in the present invention can be prepared, for example, from polyethylene glycol and adipic acid through usual method.

Further in the present invention, it is preferred to add a metal salt, particularly a perchloric acid salt of metal. This is because in the obtained rubber composition for treads, a metal ion forms a network with oxygen atom in the molecule of the diester of adipic acid to cause an ion conductivity and thus an electric resistance of the obtained rubber composition for treads can be decreased.

Such a metal salt may be one which can provide a metal ion in the rubber composition of the present invention. Examples thereof are, for instance, perchloric acid salts such as $LiClO_4$, $KClO_4$, $NaClO_4$ and $Mg(ClO_4)_2$, and particularly a lithium salt is preferred. Among them, $LiClO_4$ is preferred from the points of being free from a risk of an explosion and being safe and enhancing abrasion resistance of the obtained tread.

An adding amount of the metal salt may be from 1 to 5 parts by weight based on 100 parts by weight of the above-mentioned diester of adipic acid, preferably from 3 to 5 parts by weight from the viewpoint of high electric conductivity.

Further in the present invention, it is preferred to add a silane coupling agent. This is because the addition of the silane coupling agent results in chemical bonding of the above-mentioned diester of adipic acid and a diene rubber through the silane coupling agent, and further the rolling resistance can be reduced and wet performance can be enhanced to reduce dependency of hardness on a temperature.

Silane coupling agents which have been used in the field of tires may be used without any limitation. Examples of the preferred silane coupling agent are, for instance, vinyltrimethoxysilane, vinyltriethoxysilane, N-(2-aminoethyl)-3-aminopropylmethyldimethoxysilane, 3-aminopropyltriethoxysilane, 3-glycidoxypropylmethyldimethoxysilane, and the like.

The amount of added silane coupling agent may be the minimum which is necessary for reducing rolling resistance and enhancing wet performance, and can be optionally selected by a person skilled in the art.

In addition to the above-mentioned components, if necessary, to the rubber composition of the present invention optionally be added a filler such as talc, clay or carbon black; a softening agent such as a paraffinic, aromatic or naphthenic process oil; a tackifier such as a cumarone-indene resin, rosine resin or cyclopentadiene resin; a vulcanizing agent such as sulfur or peroxide; a vulcanization accelerator; an activator aid such as a stearic acid or zinc oxide; a rubber antioxidant; and the like, in a range not impairing effects of the present invention.

A method for preparing the rubber composition for treads of the present invention is explained below.

The rubber composition for treads of the present invention can be obtained by kneading the above-mentioned components at one time through usual method. It is, however, preferable from the point of adhering the diester of adipic acid to the silica surface, that the diester of adipic acid is previously kneaded with silica to carry the diester of adipic acid physically or chemically on the silica surface, and is then kneaded with other components.

In the case of adding the metal salt, it is preferable from the point of forming a network having ion-conductivity that the metal salt is previously kneaded with the diester of adipic acid.

The present invention is then explained in more detail by means of the following Examples, but is not limited by them.

At first, each component used in Examples is shown in Table 1.

TABLE 1

| Components used | Adding amount (parts by weight) |
|---|---|
| Natural rubber | 50 |
| Diene rubber | 50 |
| SBR1500 available from Sumitomo Chemical Industries Co., Ltd. (styrene-butadiene rubber) | |
| Silica | 75 |
| Ultrasil VN3 available from Degussa Co. | |
| Diester of adipic acid | Variable |
| A  US-600 available from Sanken Kako Co. (di(polyethylene glycol) adipate, m = 14) | |
| B  US-70 available from Sanken Kako Co. (di(diethylene glycol monoalkyl ether) adipate, n = 4) | |
| Lithium salt | Variable |
| Lithium perchlorate ($LiClO_4$) | |
| Silane coupling agent | 6 |
| Si69 available from Degussa Co. (bis(3-triethoxysilylpropyl)tetrasulfene) | |
| Carbon black | 15 |
| N330 available from Showa Cabbot Co. | |
| Process Oil | 20 |
| Dyana Process PS32 available from Idemitsu Kosan Kabushiki Kaisha | |
| Wax | 2 |
| Sannoc wax available from Ohuchi Shinko Kaguku Kogyo Kabushiki Kaisha | |
| Rubber antioxidant | 2 |
| Santoflex 13 available from Flexsys Co. ((N-1,3-dimethylbutyl)-N'-phenyl-p-phenylenediamine) | |
| Stearic acid | 2 |
| KIRI available from NOF Corporation | |
| Zinc white | 2 |
| Zinc Oxide No. 2 available from Mitsui Kinzoku Kogyo Kabushiki Kaisha | |
| Sulfur | 1.5 |
| Sulfur available from Kabushiki Kaisha Karuizawa Seirensho | |
| Vulcanization accelerator | |
| A  Nocceler NS available from Ohuchi Shinko Kagaku Kogyo Kabushiki Kaisha | 2 |
| B  Soxinol D available from Sumitomo Chemical Industries Co., Ltd. (diphenyl guanidine) | 1 |

EXAMPLES 1 TO 3

All components except sulfur and vulcanization accelerator were kneaded at about 150° C. for four minutes by using a 1.7-liter Banbury mixer made by Kobe Steel, Ltd., mixed according to amounts shown in Tables 1 and 2 to give a kneaded product. To the obtained kneaded product were added 1.5 parts by weight of sulfur and 3.0 parts by weight of a vulcanization accelerator, followed by kneading at 80° C. for about four minutes by a twin-roller, and further vulcanizing at 170° C. for ten minutes to give rubber compositions 1 to 3 for treads of the present invention.

With respect to the obtained vulcanized rubber compositions for treads, tests were made according to the following methods. The results are shown in Table 2.

(Test methods) ① Volume specific resistance ($log\delta V$): A sample of 15 cm×15 cm ×2 mm was made from the vulcanized rubber composition for treads, and a volume specific resistance was measured by using an electric resistance meter ADVANTESTER 8340A available from Advantest Co. under the conditions of an applied voltage of 1000 V, a temperature of 25° C. and a humidity of 50%. The volume specific resistance is preferably less than 11. ② Rolling resistance: A tire of 175/70R13 having a tread made from an unvulcanized rubber composition for tread was produced and a rolling resistance was measured by running it at a load of 345 kg, an inside pressure of 200 kPa and a speed of 80 km/h by using a tester made by Kobe Kikai Kabushiki Kaisha. The rolling resistance was evaluated with an index obtained assuming that the index in case of Comparative Example 1 described hereinafter was 100. It is preferred that the larger the index is, the lower the rolling resistance is. ③ Abrasion resistance: Tires of 175/70R13 having treads made from an unvulcanized rubber composition for treads were produced and mounted on a car. After running the car 30000 km on an ordinary road and expressway, the depth of remaining groove of the tread was measured to evaluate abrasion resistance by an index obtained assuming that the index in case of Comparative Example 1 described hereinafter was 100. It is preferred that the larger the index is, the more excellent the abrasion resistance is. ④ Wet performance: The car used in the test of above ③ circled around a test course where tiles of low μ were spread and water was scattered all over the course. A maximum speed at the time when the tire slipped was measured to evaluate wet performance by an index obtained assuming that the index of Comparative Example 1 was 100. It is preferred that the larger the index is, the more excellent the wet performance is. ⑤ Electric resistance of tire: By using the tires used in the test of above ③, a resistance between the center part of a rim and the conductive plate contacting to the tire was measured with a megohmmeter under the conditions of an inside pressure of 200 kPa, a load of 2.94 kN, an applied voltage of 1000 V, a temperature of 25° C. and a humidity of 50%. It is preferred that the electric resistance is less than 9.

EXAMPLES 4 AND 5

The same procedures as in Example 1 were conducted according to mixing amounts shown in Tables 1 and 2 except that a lithium salt was previously mixed to the diester of adipic acid. Thus the vulcanized rubber compositions 4 and 5 for treads of the present invention were obtained, and tests were carried out. The results are shown in Table 2.

EXAMPLE 6

The same procedures as in Example 1 were conducted according to mixing amounts shown in Tables 1 and 2 except that silica and diester of adipic acid were previously mixed. Thus the vulcanized rubber composition 6 for treads of the present invention was obtained, and tests were carried out. The results are shown in Table 2.

COMPARATIVE EXAMPLES 1 TO 3

Rubber compositions 1 to 3 for comparison were prepared in the same manner as in Example 1 except that the mixing amounts were changed to those shown in Table 2. The same tests as in Example 1 were carried out. The results are shown in Table 2.

TABLE 2

|  |  | Ex. |  |  | Com. Ex. |  | Ex. |  | Com. Ex. | Ex. |  |  |  |
|---|---|---|---|---|---|---|---|---|---|---|---|---|---|
|  |  | 1 | 2 | 3 | 1 | 2 | 4 | 5 | 3 | 6 | 7 | 8 | 9 |
| Mixing amount |  |  |  |  |  |  |  |  |  |  |  |  |  |
| Diester of adipic acid | A | 5 | 20 | 40 | — | 3 | 19 | 15 | 50 | 20 | — | — | — |
| (parts by weight) | B | — | — | — | — | — | — | — | — | — | 19 | 5 | 20 |
| Lithium salt (part by weight) |  | — | — | — | — | — | 1 | 5 | — | — | 1 | 5 | — |
| Results of evaluation |  |  |  |  |  |  |  |  |  |  |  |  |  |
| Volume specific resistance logδV (Ωcm) |  | 10.4 | 9.8 | 8.6 | 13.9 | 12.1 | 9.4 | 8.8 | 8.5 | 9.6 | 9.2 | 8.6 | 9.5 |
| Electric resistance of tire logΩ (Ω) |  | 8.0 | 7.3 | 6.5 |  | 9.4 | 7.0 | 6.7 | 6.4 | 7.2 | 7.0 | 6.6 | 7.4 |
| Rolling resistance (index) |  | 105 | 114 | 121 | 100 | 101 | 114 | 114 | 122 | 114 | 113 | 113 | 113 |
| Abrasion resistance (index) |  | 98 | 95 | 92 | 100 | 100 | 97 | 99 | 85 | 95 | 95 | 98 | 94 |
| Wet performance (index) |  | 101 | 105 | 109 | 100 | 100 | 105 | 105 | 110 | 106 | 104 | 104 | 104 |

EXAMPLES 7 AND 8

Vulcanized rubber compositions 7 and 8 for treads of the present invention were prepared in the same manner as in Examples 4 and 5 except that kind of the diester of adipic acid was changed, and tests were carried out. The results are shown in Table 2.

EXAMPLE 9

Vulcanized rubber composition 9 for treads of the present invention was prepared in the same manner as in Example 6 except that kind of the diester of adipic acid was changed, and tests were carried out. The results are shown in Table 2.

From the results of evaluations of Example 1 and Comparative Examples 1 and 2, it is seen that when the adding amount of the diester of adipic acid is less than 5 parts by weight, electric resistance is not reduced.

From the results of evaluations of Example 3 and Comparative Example 3, it is seen that when the adding amount of the diester of adipic acid exceeds 40 parts by weight, abrasion resistance is lowered.

According to the present invention, the rubber composition for treads which contains silica and has a low electric resistance can be obtained, and further the rubber composition for treads, which contains silica, has well-balanced characteristics such as a low rolling resistance, abrasion resistance and good wet performance.

What is claimed is:

1. A rubber composition for tread which comprises 40 to 90 parts by weight of silica and 5 to 40 parts by weight of diester of adipic acid based on 100 parts by weight of a diene rubber, wherein the rubber composition further comprises 1 to 5 parts by weight of a perchloric acid metal salt based on 100 parts by weight of the diester of adipic acid.

2. The rubber composition for tread of claim 1, wherein the silica has a specific surface area from 150 to 250 m$^2$/g.

3. The rubber composition for tread of claim 1, wherein the silica has a DPB oil absorption amount of from 190 to 280 ml/100 g.

4. The rubber composition for tread of claim 1, wherein the diene rubber is at least one selected from the group consisting of natural rubber, isoprene rubber, ethylene propylene rubber, isoprene-butadiene rubber, butadiene rubber, acrylonitrile-butadiene rubber, and chloroprene rubber.

5. The rubber composition for tread of claim 1, wherein the diester of adipic acid is represented by formula (1):

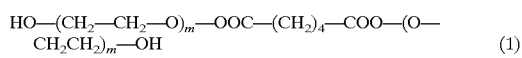
(1)

wherein m is an integer of from 10 to 20.

6. The rubber composition for tread of claim 1, wherein the diester of adipic acid is represented by formula (2):

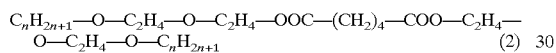
(2)

wherein n is 1, 2 or 4.

7. The rubber composition for tread of claim 1, wherein the perchloric acid metal salt is selected from the group consisting of LiClO$_4$, KClO$_4$, NaClO$_4$ and Mg(ClO$_4$)$_2$.

8. The rubber composition for tread of claim 1, which further comprises a silane coupling agent.

9. The rubber composition for tread of claim 8, wherein the silane coupling agent is selected from the group consisting of vinyltrimethoxysilane, vinyltriethoxysilane, N-(2-aminoethyl)-3-aminopropylmethyldimethoxysilane, 3-aminopropyltriethoxysilane, and 3-glycidoxypropylmethyldimethoxysilane.

10. The rubber composition for tread of claim 1, which further comprises:
- a filler selected from the group consisting of talc, clay or carbon black;
- a softening agent selected from the group consisting of paraffinic process oil, aromatic process oil and naphthenic process oil;
- a tackifier selected from the group consisting of cumarone-indene resin, rosine resin and cyclopentadiene resin;
- a vulcanizing agent selected from the group consisting of sulfur and peroxide;
- a vulcanization accelerator;
- an activator aid selected from the group consisting of stearic acid and zinc oxide; and
- a rubber antioxidant.

11. The rubber composition for tread of claim 1, wherein the perchloric acid metal salt is previously kneaded with the diester of adipic acid, whereby a network having ion-conductivity is formed.

12. The rubber composition for tread of claim 1, wherein the silica is previously kneaded with the diester of adipic acids whereby the diester of adipic acid adheres to the silica surface.

13. The rubber composition for tread of claim 10, wherein the rubber antioxidant is (N-1,3-dimethylbutyl) -N'-phenyl-p-phenylenediamine.

* * * * *